March 7, 1961 B. W. SZNYCER 2,973,923
HELICOPTER CONSTRUCTION
Filed May 3, 1957

INVENTOR.
BERNARD W. SZNYCER
BY *Mauro & Lewis*
ATTY'S.

United States Patent Office 2,973,923
Patented Mar. 7, 1961

2,973,923

HELICOPTER CONSTRUCTION

Bernard W. Sznycer, New York, N.Y., assignor to Omega Aircraft Corporation, New York, N.Y., a corporation of New York Filed May 3, 1957, Ser. No. 656,903

4 Claims. (Cl. 244—17.11)

The present invention relates to a helicopter of the single rotor type wherein the fuselage configuration and the nature and arrangement of the driving components permit a large centrally located cargo space which is unobstructed by structural elements of the aircraft, the said space being directly adjacent the ground when the helicopter is at rest.

In early single rotor helicopter designs having any capability of flight, the engine and driving means leading to the rotor shaft were usually located at the center of gravity, which in all such machines is beneath the rotor shaft itself. It was soon recognized that such machines were handicapped in their weight carrying capacity since cargo or passengers were necessarily located in cabin space remote from or to one side of the center of gravity of the machine and the weight carried could not be increased beyond the ability of the rotor pitch control mechanism to compensate for the resulting lack of equilibrium of the machine.

More recently, most practical single rotor designs provide a cabin for cargo which is located beneath the rotor shaft, the driving components having been located elsewhere. The motor, for example, may be located forward under the pilot's cabin. This arrangement does provide for an enclosed centrally located cargo space, but so far at the expense of creating an obstacle to loading by virtue of lower component members of the structure.

It being extremely desirable, under some circumstances, as will be pointed out below, to carry cargo externally of the aircraft, such conventional cargo-cabin type machines have lifted cargo slung beneath, as in nets. This arrangement is far from satisfactory, however, since it requires that the machine take up the load of the cargo after it has risen, thus sacrificing an increase in lifting capacity due to proximity of the loaded helicopter to the ground. Also any such cargo slung beneath the fuselage creates wind resistance to forward flight and tends to sway and disturb the balance of the machine.

Any helicopter wherein a cabin is provided for cargo possesses certain disadvantages. The size of cargo items is limited to the size of the cargo door. The cargo cannot be quickly loaded or unloaded, and requires lifting to the floor level.

The desirability of attaching cargo closely adjacent to the fuselage at the center of gravity, without providing a cabin space therefor, has already been recognized in the design of a machine known as the Hughes XH-17 or "Flying Crane," wherein the entire fuselage with control cabin is elevated from the ground on four stilt-like legs. The differences between this design and the present invention will be apparent from the disclosure below.

The present invention is characterized by the provision, in a single rotor helicopter, of a shallow elongated fuselage extending rearward to the tail rotor without any enclosure such as a metallic skin.

Forward of the rotor, the fuselage framework extends downwardly, almost vertically with respect to the main body, then forwardly to provide support for a control and passenger cabin which is only slightly elevated by forward landing wheels from the ground. Spaced aft from the rotor shaft are two landing wheels carried by elongated supports which carry the main body of the fuselage in parallel relation with the ground. Thus the cargo, as a rule, will be located not only centrally with respect to the rotor mast—but also being located in the wake of the cabin structure will reduce its aerodynamic drag and by its proximity to the center of gravity will reduce or alleviate the problem of sway disturbance to the pilot.

Forming part of the novel construction is the provision of a pair of motors supported on short lateral extensions of the fuselage body, canted slightly to the rear of the rotor shaft. The weight of these motors at the position indicated further compensates for the cabin weight. The provision of a pair of motors, furthermore, equidistantly arranged close to the sides of the rotor shaft, assures a counterbalancing effect not possible with a single motor design. The driving connection between the motors and the common rotor shaft includes a belt drive for each, and the location of the motors is closely adjacent the sides of the fuselage, the details of which arrangement is the subject of copending applications for patents.

The gasoline supply is preferably contained in one or more tanks (two being shown) located directly beneath the rotor or closely adjacent thereto. Gasoline consumption will be drawn from the center of gravity and will not comprise a weight-loss factor unbalancing the overall design.

By this construction, the details of which will be further described, there is achieved a helicopter wherein a substantial unencumbered space is provided directly beneath the fuselage between the cabin structure and rear landing gear. In this space may be attached a cargo supported directly from the fuselage in such manner as to accomplish loading and unloading without having to lift to a customary floor level.

The advantages inherent from this construction are manifold. With or without load the machine is in balance since the heavy components such as motor and tanks are at the center of gravity, as well as any cargo. Any cargo attached to the cargo space may be prebalanced and quickly attached in the space provided. Such cargo may be packed in containers or pods, of which a plurality may be provided at various destinations for quick transfer. The machine may be flown over and landed directly above the cargo and the cargo quickly attached. The control cabin is quickly accessible to the ground on landing so that the pilot or passengers may load or unload. In flight, the cargo is within the slipstream formed by the cabin forward, and hence the cargo represents no appreciable added wind resistance. Means are provided whereby release of the cargo in midair may be controlled from the cabin if an aerial drop is desired. The cargo may be securely anchored to avoid independent motion during flight. These advantages assume great importance, singly and collectively, as anyone skilled in the requirements of helicopter use for industrial and military applications will appreciate.

Further objects and advantages of the invention will appear from a description of the drawing, wherein.

Figure 1:
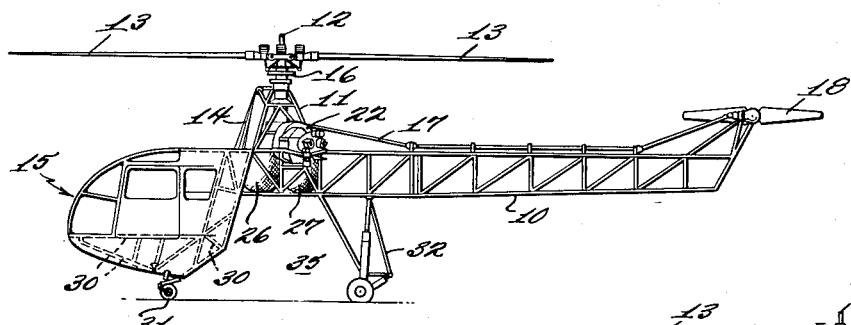
Figs. 1, 2 and 3 are side, front and top elevations of a machine constructed according to the invention.

The main body 10 of the fuselage is formed of welded tubular metallic members, suitably cross braced. Body 10 is box shaped in cross-section, having no appreciable depth throughout as compared to a fuselage frame of conventional cargo-cabin helicopters.

The forward portion of body 10 supports a pylon 11, within which is mounted the rotor shaft 12 carrying four pivoted rotor blades 13. Control wires 14 leading from the cabin 15 adjust the pitch of a swash plate 16 to impart collective and cyclic pitch to rotor blades 13. A drive shaft 17 connects from rotor shaft 12 to tail rotor 18.

Extending laterally from body 10 on opposite sides of pylon 11, are twin motor outriggers or supports 20—21, which are of the same welded tubular construction as body 10. Supports 20—21 carry a pair of motors 22—23. As is apparent from Fig. 3, supports 20—21 are canted slightly aft of rotor shaft 12 so that the weight of motors 22 and 23 acts to counterbalance the weight of cabin 15 carrying the pilot.

Figure 2:
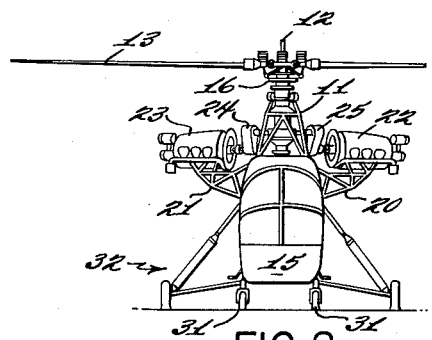

The driving connections between the motors 22—23 and rotor shaft 12 are not shown in detail in the present specification. Prefered means for each motor consist of connecting each engine crankshaft through a constant velocity universal joint and a ratchet-jaw clutch to a belt drive shown at 24—25, Fig. 2, the latter connecting through a spiral bevel pinion with a spiral bevel gear carried by the rotor shaft.

Beneath pylon 11, the structural members of fuselage body 10 are suitably modified to provide interval spaces in which are mounted a pair of fuel tanks 26—27, as seen in Fig. 1. Tanks 26—27 are preferably of a reinforced rubber substitute. Fuel is consumed from these tanks by suitable connections, not shown, which insure that each tank is emptied at an equal rate with the other, to preserve balance.

Figure 3:
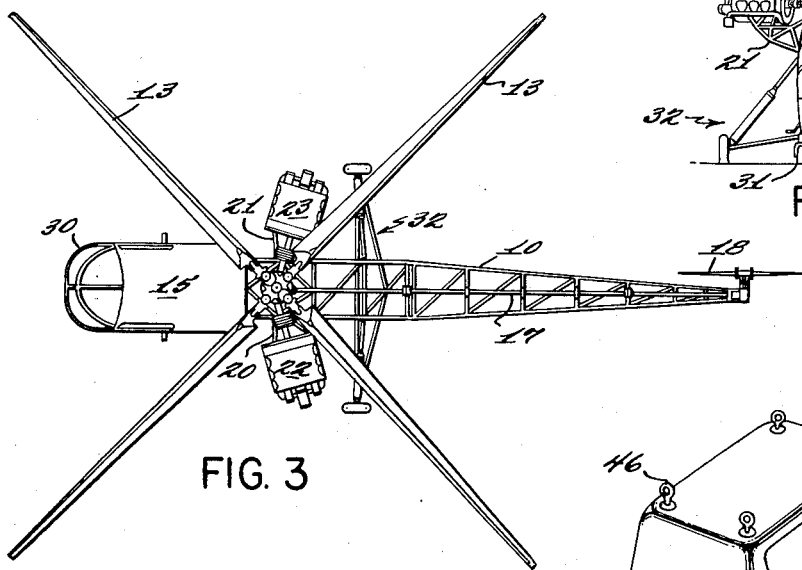

Forward of shaft 12, the structural elements of body 10 are extended downwardly and forwardly as indicated by the cabin framework 30, Figs. 1 and 3. The entire fuselage structure may thus be described as a zig-zag or step-down design.

Cabin 15 is suitably built upon frame 30 and the latter supported on the short nose wheels 31 equipped with shock absorbers.

Spaced aft of the shaft 12, the rear or main landing gear 32 is composed of a pair of wheels carried on legs which extend outwardly to provide a wheel base of substantial width, preferably in excess of the distance to which motors 22—23 extend to either side of fuselage 10. Suitable fore-and-aft braces and shock absorbers are combined with landing gear 32.

Landing gear 32 and nose wheels 31 provide a broad four point suspension for the helicopter with the main heavy components (engine tanks, drive shafts, etc.) disposed within the perimeter defined by the four landing wheels.

By the arrangement above described it will be appreciated that there is provided in the area beneath the forward portion of body 10 and between the depending cabin 15 and main landing gear 32 a substantial cargo area or bay 35 which is unencumbered by structural elements of the helicopter between body 10 and the ground.

Figure 4:
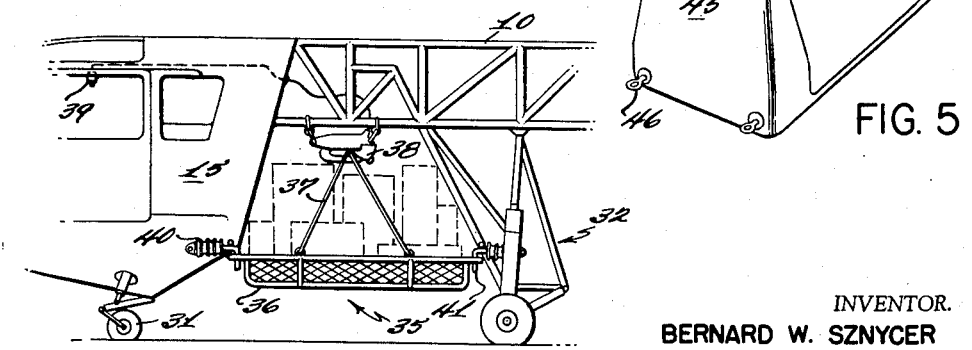
Fig. 4 is a fragmentary side elevation showing how cargo may be attached in the central cargo space.

In this cargo space 35, cargo may be attached to the body 10 by various means, as preferred. Large cargo items may be roped or strapped to body 10. Small cargo items may be carried in nets or in a basket 36 such as shown in Fig. 4. In this view the basket 36 is slung by cables 37 to a cargo release hook 38 of conventional design which is actuable electrically as by closing switch 39 located in cabin 15. Basket 36 is cushioned against sway as by means of resiliently mounted side hooks 40—41 carried on cabin 15 and landing gear 32. Hooks 40—41 depend downwardly and do not support basket 36 or prevent it from dropping when release hook 38 is opened.

Such means and other known substitutes may be employed to release cargo either in midair or after landing without the need of the pilot to leave the cabin.

Figure 5:
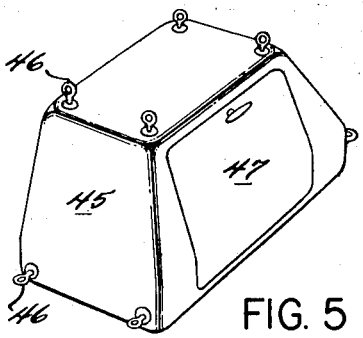
Fig. 5 is a perspective view of a container or pod for carrying cargo which may be attached in the cargo space of the machine.

Alternatively, a cargo container or pod such as container 45, Fig. 5 may be fabricated to fit the cargo space 35. Pod 45 is shown as equipped with top and side attaching rings 46 and a door 47. Pod 45 may be suspended from body 10 by one or more release hooks 38 in the manner above described for basket 36.

The provision of a plurality of cargo carrying means such as basket 36 or cargo pod 45 makes it possible to load and unload the machine with extreme rapidity at a plurality of destinations, in a matter of seconds.

What is claimed is:

1. In a single rotor helicopter, in combination, a fuselage, the main body portion whereof consists of a single elongated fuselage frame, the forward portion whereof consists of a cabin structure connected to and downwardly depending from said fuselage frame; a single rotor, having rotor blades mounted on the said body portion of the fuselage adjacent the forward end thereof substantially above the normal center of gravity of the helicopter; said main body portion and said cabin structure defining a cargo bay located beneath said main body portion, the center of which cargo bay is located substantially beneath said rotor and occupying a zone surrounding said center of gravity, the forward end of said cargo bay extending forwardly to the rear of said cabin portion, said cargo bay being unobstructed by structural elements in the direction of the ground; driving means for said rotor mounted on said main body portion of the fuselage in a position to preserve the location of said center of gravity at the aforesaid position beneath said rotor without occupying any portion of said cargo bay and landing gear means connected to said fuselage, said means supporting said cabin structure in close proximity to the ground and said main body portion a relatively substantial distance above the ground, said landing gear means including at least two ground engaging members spaced from each other at opposite sides of said fuselage frame a distance substantially in excess of the width of said cargo bay.

2. In a single rotor helicopter, in combination, a fuselage, the main body portion whereof consists of a single elongated fuselage frame, the forward portion whereof consists of a cabin structure connected to and downwardly depending from said fuselage frame; landing gear means connected to said fuselage, said landing gear means, while the helicopter is at rest on the ground, supporting said cabin structure in close proximity to the ground and said main body portion a relatively substantial distance above the ground; a single rotor, having rotor blades mounted on the said body portion of the fuselage adjacent the forward end thereof substantially above the normal center of gravity of the helicopter; said main body portion and said cabin structure defining a cargo bay located beneath said main body portion, the center of which cargo bay is located substantially beneath said rotor and occupying a zone surrounding said center of gravity, the forward end of said cargo bay extending forwardly to the rear of said cabin portion, said cargo bay being unobstructed by structural elements in the direction of the ground; and driving means for said rotor comprising a pair of motors each connected to said rotor, said motors being located on lateral extensions of said main body portion in such positions that said motors are carried equidistantly from and aft of said rotor, the weight of said motors counterbalancing each other and the weight of said cabin structure, said motors thus preserving the location of said center of gravity at the aforesaid zone beneath said rotor without occupying any portion of said cargo bay.

3. The invention according to claim 1, including cargo carrying means releasably connected to said fuselage frame in said cargo bay.

4. The invention according to claim 1, including cargo carrying means, connecting means attaching said cargo carrying means to said fuselage frame in said cargo bay, said connecting means including release means extending to and operable from said cabin structure.

References Cited in the file of this patent

UNITED STATES PATENTS

| | | |
|---|---|---|
| 2,075,042 | Knerr | Mar. 30, 1937 |
| 2,318,259 | Sikorsky | May 4, 1943 |
| 2,613,961 | Wescott | Oct. 14, 1952 |
| 2,755,038 | Gluhareff | July 17, 1956 |
| 2,856,224 | Kelly et al. | Oct. 14, 1958 |

FOREIGN PATENTS

| | | |
|---|---|---|
| 725,820 | Great Britain | Mar. 9, 1955 |